United States Patent
Park et al.

(10) Patent No.: US 11,973,212 B2
(45) Date of Patent: Apr. 30, 2024

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Jung Bae Park, Cheongju-si (KR); Hyun Jong Yu, Cheongju-si (KR); Moon Ho Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 193 days.

(21) Appl. No.: 17/355,987

(22) Filed: Jun. 23, 2021

(65) Prior Publication Data
US 2022/0069289 A1    Mar. 3, 2022

(30) Foreign Application Priority Data
Sep. 2, 2020   (KR) .................. 10-2020-0111715

(51) Int. Cl.
*H01M 4/36*   (2006.01)
*H01M 4/02*   (2006.01)
(Continued)

(52) U.S. Cl.
CPC ........... *H01M 4/364* (2013.01); *H01M 4/366* (2013.01); *H01M 4/505* (2013.01); *H01M 4/525* (2013.01);
(Continued)

(58) Field of Classification Search
CPC .... H01M 4/0404; H01M 4/0471; H01M 4/62; H01M 4/131; H01M 4/364; H01M 4/366; H01M 4/485; H01M 4/505; H01M 4/525; H01M 4/628; H01M 4/1391; H01M 4/5825; H01M 10/052; H01M 10/0525;
(Continued)

(56) References Cited

U.S. PATENT DOCUMENTS

2005/0181279 A1  8/2005  Hosoya
2014/0038052 A1  2/2014  Song et al.
(Continued)

FOREIGN PATENT DOCUMENTS

CN   103022499 A   4/2013
CN   110582875 A   12/2019
(Continued)

*Primary Examiner* — Mayla Gonzalez Ramos
*Assistant Examiner* — Bethany C Garcia
(74) *Attorney, Agent, or Firm* — Studebaker & Brackett PC

(57) ABSTRACT

The present invention relates to a positive electrode active material and a lithium secondary battery including the same, and more particularly, to a bimodal-type positive electrode active material including a first lithium composite oxide, which is a small particle, and a second lithium composite oxide, which is a large particle, these particles having different particle diameters, wherein the positive electrode active material makes it possible to prevent deterioration in electrochemical properties and stability thereof, which are generated due to non-uniform formation of a coating layer at least partially coating surfaces of the small and large particles, a positive electrode including the positive electrode active material, and a lithium secondary battery using the same.

12 Claims, 2 Drawing Sheets

(51) Int. Cl.
*H01M 4/505* (2010.01)
*H01M 4/525* (2010.01)

(52) U.S. Cl.
CPC ............... *H01M 2004/021* (2013.01); *H01M 2004/028* (2013.01)

(58) Field of Classification Search
CPC ......... H01M 10/446; H01M 2004/021; H01M 2004/028; H01M 4/02; H01M 4/36; C01G 53/006; C01G 53/42; C01G 53/50; C01G 53/44; Y02E 60/10; Y02E 60/50; C01P 2004/53; C01P 2002/52; C01P 2002/54; C01P 2002/85; C01P 2004/60; C01P 2004/61; C01P 2006/40; Y02T 10/70; Y02P 70/50
See application file for complete search history.

(56) References Cited

U.S. PATENT DOCUMENTS

| | | | |
|---|---|---|---|
| 2015/0162598 A1* | 6/2015 | Kim | H01M 4/62 |
| | | | 429/231.1 |
| 2020/0083524 A1* | 3/2020 | Baek | H01M 4/587 |
| 2020/0266438 A1* | 8/2020 | Han | H01M 4/505 |

FOREIGN PATENT DOCUMENTS

| | | |
|---|---|---|
| EP | 3 663 265 A2 | 6/2020 |
| EP | 696 894 A1 | 8/2020 |
| JP | 2015-528181 A | 9/2015 |
| JP | 2015-536558 A | 12/2015 |
| JP | 2018-500720 A | 1/2018 |
| JP | 2020-77611 A | 5/2020 |
| KR | 10-2014-0018685 A | 2/2014 |
| KR | 10-2014-0098433 A | 8/2014 |
| KR | 10-2020-0044448 A | 4/2020 |

* cited by examiner

POSITIVE ELECTRODE ACTIVE MATERIAL AND LITHIUM SECONDARY BATTERY COMPRISING THE SAME

CROSS-REFERENCE TO RELATED APPLICATION

This application claims priority to and the benefit of Korean Patent Application No. 10-2020-0111715, filed on Sep. 2, 2020, the disclosure of which is incorporated herein by reference in its entirety.

BACKGROUND

1. Field of the Invention

The present invention relates to a positive electrode active material and a lithium secondary battery including the same, and more particularly, to a bimodal-type positive electrode active material including a first lithium composite oxide, which is a small particle, and a second lithium composite oxide, which is a large particle, these particles having different particle diameters, wherein the positive electrode active material makes it possible to prevent deterioration in electrochemical properties and stability thereof, which occurs due to non-uniform formation of a coating layer at least partially coating surfaces of the small and large particles, a positive electrode including the positive electrode active material, and a lithium secondary battery using the same.

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is produced by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

Meanwhile, recently, for high capacity of a lithium secondary battery, a bimodal-type positive electrode active material in which small particles and large particles, which have different average particle sizes, are mixed, is occasionally used. When small particles and large particles are mixed, voids between the large particles may be filled with small particles with relatively small average particle diameters, so that the integration density of a lithium composite oxide in a unit volume may be enhanced and thus the energy density per unit volume may increase.

However, when the small particles and the large particles, which have been mixed with a coating raw material, are simultaneously calcined, as the coating raw material is predisposed toward small particles with a relatively large specific surface area, a coating imbalance problem between small particles and large particles may occur, and may act as the cause of reducing the electrochemical properties and stability of the bimodal-type positive electrode active material in which small particles and large particles are mixed.

SUMMARY OF THE INVENTION

In the lithium secondary battery market, the growth of lithium secondary batteries for electric vehicles plays a leading role, and the demand for positive electrode materials used in lithium secondary batteries is also constantly changing.

For example, conventionally, in terms of securing safety, lithium secondary batteries using LFP have been mainly used. However, recently, the use of a nickel-based lithium composite oxide, which has a larger energy capacity per weight than LFP, is expanding.

In line with the above trend of the positive electrode active materials, the present invention is directed to providing a bimodal-type positive electrode active material, which includes a first lithium composite oxide, which is a small particle, and a second lithium composite oxide, which is a large particle, the particles having different average particle diameters, and therefore, the positive electrode active material has a high energy density.

Particularly, the present invention relates to a positive electrode active material that makes it possible to improve electrochemical properties and stability by reducing a non-uniform coating phenomenon of a coating layer that at least partially coats the surfaces of small particles and large particles among the bimodal-type positive electrode active materials.

In addition, the present invention is also directed to providing a positive electrode including the positive electrode active material defined herein.

Moreover, the present invention is also directed to providing a lithium secondary battery using the positive electrode defined herein.

The objects of the present invention are not limited to the above-mentioned objects (e.g., for electric vehicles), and other objects and advantages of the present invention which are not mentioned can be understood by the following description and more clearly understood by exemplary embodiments of the present invention. In addition, it will be readily apparent that the objects and advantages of the present invention may be realized by the means indicated by the claims and a combination thereof.

One aspect of the present invention provides a bimodal-type positive electrode active material, which includes a first lithium composite oxide, which is a small particle, and a second lithium composite oxide, which is a large particle.

Here, the positive electrode active material may include a first coating layer covering at least a part of the surface of the first lithium composite oxide and including a metal oxide, and a second coating layer covering at least a part of the surface of the second lithium composite oxide and including a metal oxide.

Here, when the occupancy ratio (at %) of the first coating layer on the surface of the first lithium composite oxide is r1, and the occupancy ratio (at %) of the second coating layer on the surface of the second lithium composite oxide is r2, the r1 and the r2 may satisfy Equation 1 below.

$$0.71 < r2/r1 \quad \text{[Equation 1]}$$

In addition, the first lithium composite oxide and the second lithium composite oxide may be represented by Formula 1 below.

$$Li_wNi_{1-(x+y+z)}Co_xM1_yM2_zO_{2+\alpha} \quad \text{[Formula 1]}$$

(Here, M1 is at least one selected from Mn and Al, M2 is at least one selected from P, Sr, Ba, B, Ce, Cr, Mn, Mo, Na, K, Ti, Zr, Al, Hf, Ta, Mg, V, Zn, Si, Y, Sn, Ge, Nb, W and Cu, M1 and M2 are different from each other, $0.5 \leq w \leq 1.5$, $0 \leq x \leq 0.50$, $0 \leq y \leq 0.20$, $0 \leq z \leq 0.20$, and $0 \leq \alpha \leq 0.02$)

The metal oxides included in the first coating layer and the second coating layer may be represented by Formula 2 below.

$$Li_aM3_bO_c \quad \text{[Formula 2]}$$

(Here, M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 10$, $0 \leq b \leq 8$, and $2 \leq c \leq 13$)

Meanwhile, among the bimodal-type positive electrode active materials, the first lithium composite oxide and the second lithium composite oxide may have different grain boundary densities. The grain boundary density may be an indicator that indirectly indicates the number of primary particles in a lithium composite oxide constituting a positive electrode active material in the form of a secondary particle formed by generally aggregating a plurality of primary particles, and in the present invention, the grain boundary densities of the first lithium composite oxide and the second lithium composite oxide are defined by Equations 3 below.

Specifically, the first lithium composite oxide is a composite particle including at least one primary particle, and may have a grain boundary density calculated by Equation 3 below of 0.75 or less with respect to the primary particles lying on the imaginary straight line crossing the center of the first lithium composite oxide in the cross-sectional SEM image of the first lithium composite oxide.

Grain boundary density=(Number of interfaces between primary particles lying on the imaginary straight line/number of primary particles lying on the imaginary straight line) [Equation 3]

In this case, the first lithium composite oxide may have a single crystal structure.

In addition, the second lithium composite oxide is a composite particle including at least one primary particle, and may have a grain boundary density calculated by Equation 3 below of 0.90 or more with respect to the primary particles lying on the imaginary straight line crossing the center of the second lithium composite oxide in the cross-sectional SEM image of the second lithium composite oxide.

Grain boundary density=(Number of interfaces between primary particles lying on the imaginary straight line/number of primary particles lying on the imaginary straight line) [Equation 3]

As such, the first lithium composite oxide and the second lithium composite oxide in the bimodal-type positive electrode active material have different grain boundary densities within different ranges, and the electrochemical properties and stability of the positive electrode active material can be improved by reducing the deviation between occupancy ratios of coating layers at least partially occupying the surfaces of the first lithium composite oxide and the second lithium composite oxide, respectively.

In addition, another aspect of the present invention provides a positive electrode including the positive electrode active material defined herein.

Moreover, still another aspect of the present invention provides a lithium secondary battery using the positive electrode defined herein.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawing, in which.

DETAILED DESCRIPTION OF EXEMPLARY EMBODIMENTS

Figure 1:
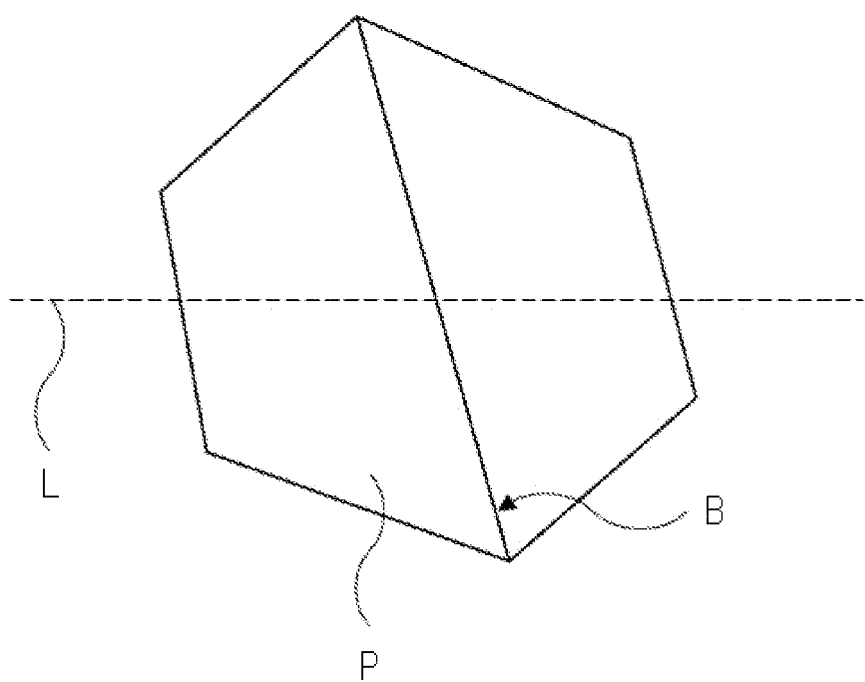
FIGS. 1 and 2 schematically show the cross-sections of lithium composite oxides for calculating the grain boundary densities defined herein.

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Hereinafter, a positive electrode active material according to the present invention, and a lithium secondary battery including the same will be described in further detail.

Positive Electrode Active Material

According to one aspect of the present invention, a bimodal-type positive electrode active material including a first lithium composite oxide, which is a small particle, and a second lithium composite oxide, which is a large particle, is provided.

In the present invention, while the ranges of an average particle diameters (D50) of the small particle and large particle are not particularly limited, to identify whether a lithium composite oxide is a small particle or a large particle, the reference ranges of the average particle diameters (D50) of the small particle and the large particle may be determined as follows.

The small particle refers to a lithium composite oxide having an average particle diameter (D50) of 8 μm or less, and the large particle refers to a lithium composite oxide having an average particle diameter (D50) of 8.5 μm or more. The upper limit of the average particle diameter (D50) of the large particle is not limited, but for example, the large particle may have an average particle size of 8.5 to 23.0 μm.

In the bimodal-type positive electrode active materials according to various embodiments of the present invention, the first lithium composite oxide and the second lithium composite oxide, which have the average particle diameters (D50) defined above, may be mixed in a weight ratio of 5:95 to 50:50.

Here, the first lithium composite oxide may be present to fill a void between the second lithium composite oxides, may be attached to the surface of the second lithium composite oxide, or agglomerate with each other.

Meanwhile, in the positive electrode active material, the first lithium composite oxide and the second lithium composite oxide are preferably present at a weight ratio of 5:95 to 50:50.

In the positive electrode active material, when the proportion of first lithium composite oxide with respect to the second lithium composite oxide is excessively small, as the press density of the positive electrode active material is decreased, an improvement in the energy density per unit volume of the positive electrode active material may be insignificant.

In addition, the positive electrode active material may have a press density of 3.63 g/cc while the first lithium composite oxide and the second lithium composite oxide are present in the above-described weight ratio.

Meanwhile, the first lithium composite oxide and the second lithium composite oxide may be lithium composite oxides represented by Formula 1 below.

$$Li_wN_{1-(x+y+z)}Co_xM1_yM2_zO_{2+\alpha}$$ [Formula 1]

(Here, M1 is at least one selected from Mn and Al, M2 is at least one selected from P, Sr, Ba, B, Ce, Cr, Mn, Mo, Na, K, Ti, Zr, Al, Hf, Ta, Mg, V, Zn, Si, Y, Sn, Ge, Nb, W and Cu, M1 and M2 are different from each other, $0.5 \leq w \leq 1.5$, $0 \leq x \leq 0.50$, $0 \leq y \leq 0.20$, $0 \leq z \leq 0.20$, and $0 \leq \alpha \leq 0.02$)

In addition, the first lithium composite oxide and the second lithium composite oxide may be lithium composite oxides which are represented by Formula 1 and have the same composition, but the present invention is not necessarily limited thereto. For example, the first lithium composite oxide and the second lithium composite oxide may have the same composition but may be synthesized by calcination of precursors with different average particle sizes, or have different compositions and may be synthesized by calcination of precursors with different average particle sizes.

Meanwhile, at least one of the first lithium composite oxide and the second lithium composite oxide, which are represented by Formula 1, and preferably, both of the first lithium composite oxide and the second lithium composite oxide may be a high-Ni type lithium composite oxide which has an Ni content (molar ratio) of 80% or more. Here, the Ni content in the first lithium composite oxide and the second lithium composite oxide may be determined by the content of x+y+z in Formula 1 below.

Ni (mol %)/(Ni+Co+M1+M2) (mol %) ≥ 80

In the case of a lithium composite oxide containing Ni, residual lithium, that is, Li impurities such as LiOH and $Li_2CO_3$, may be formed on the surface of the lithium composite oxide by mixing Li and Ni cations. The Li impurities may be gelated in the preparation of a paste for manufacturing a positive electrode, or become the cause of a cell swelling phenomenon.

The Li impurities may be formed in a larger amount of high-Ni type positive electrode active material, and as below, the positive electrode active material according to the present invention has an advantage in that Li impurities present on the surface of the lithium composite oxide may be removed in the process of forming a coating layer which covers at least a part of the surfaces of the first lithium composite oxide and the second lithium composite and includes a metal oxide.

More specifically, the positive electrode active material may include a first coating layer covering at least a part of the surface of the first lithium composite oxide and including a metal oxide, and a second coating layer covering at least a part of the surface of the second lithium composite oxide and including a metal oxide.

In addition, the metal oxides included in the first coating layer and the second coating layer may be represented by Formula 2 below. Here, the first coating layer and the second coating layer may be defined as regions in which the metal oxides represented by Formula 2 below on the surfaces of the first lithium composite oxide and the second lithium composite oxide, respectively, are present.

$$Li_aM3_bO_c$$ [Formula 2]

(Here, M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, $0 \leq a \leq 10$, $0 \leq b \leq 8$, and $2 \leq c \leq 13$)

The metal oxides included in the first coating layer and the second coating layer may be the same or different metal oxides.

In addition, the coating layer may have a form in which different types of metal oxides are present in one layer, or different types of metal oxides represented by Formula 2 are present in separate layers.

The metal oxide represented by Formula 2 may be physically and/or chemically bound with the primary particles represented by Formula 1. In addition, the metal oxide may be formed in a solid solution with the primary particles represented by Formula 1.

The positive electrode active material according to the embodiment may include a coating layer covering at least a part of the surfaces of the first lithium composite oxide and the second lithium composite oxide, thereby increasing structural stability. In addition, when such a positive electrode active material is used in a lithium secondary battery, the high-temperature stability and lifetime characteristics of the positive electrode active material may be improved. In addition, since the metal oxide may reduce residual lithium on the surfaces of the first lithium composite oxide and the second lithium composite oxide and serve as a migration pathway of lithium ions, there may be an effect of improving the efficiency characteristics of the lithium secondary battery.

In addition, the metal oxide is an oxide in which lithium and an element represented by A are combined, or an oxide of A. The metal oxide may be, for example, $Li_aW_bO_c$, $Li_aZr_bO_c$, $Li_aTi_bO_c$, $Li_aNi_bO_c$, $Li_aB_bO_c$, $Li_aCo_bO_c$, $Li_aAl_bO_c$, $Co_bO_c$, $Al_bO_c$, $W_bO_c$, $Zr_bO_c$, $Ti_bO_c$ or $B_bO_c$, but the above examples are merely described for convenience of understanding, and the oxide defined in the present invention is not limited to the above-described examples.

In another embodiment, the metal oxide may be an oxide in which lithium and at least two types of elements represented by A are combined, or may further include a metal oxide in which lithium and at least two elements represented by A are combined. The metal oxide in which lithium and at least two types of elements represented by A are combined may be, for example, $Li_a(W/Ti)_bO_c$, $Li_a(W/Zr)_bO_c$, $Li_a(W/Ti/Zr)_bO_c$, or $Li_a(W/Ti/B)_bO_c$, but the present invention is not necessarily limited thereto.

Here, the metal oxide may have a concentration gradient decreasing from the surface to the center of the secondary particle. Accordingly, the concentration of the metal oxide may decrease from the outermost surface of the secondary particle to the center of the secondary particle.

As described above, as the metal oxide has a concentration gradient decreasing from the surface to the center of the secondary particle, residual lithium present on the surface of the positive electrode active material may be effectively reduced, thereby preventing a side reaction caused by unreacted residual lithium in advance. In addition, a decrease in crystallinity in the inner surface region of the positive electrode active material caused by the metal oxide may be prevented. In addition, the breakdown of the entire structure of the positive electrode active material due to the metal oxide in an electrochemical reaction may be prevented.

In addition, the coating layer may include a first oxide layer including at least one metal oxide represented by Formula 2 and the at least one metal oxide represented by Formula 2, and may further include a second oxide layer including a metal oxide different from the metal oxide included in the first oxide layer.

For example, the first oxide layer may be present to cover at least a part of an exposed surface of the primary particle present on the outermost surface of the secondary particle, and the second oxide layer may be present to cover at least a part of the exposed surface of the primary particle, which is not covered with the first oxide layer, and the surface of the first oxide layer.

Meanwhile, when the first lithium composite oxide and the second lithium composite oxide are defined as composite particles including at least one primary particle, the coating layer may not only cover at least a part of the surface of the composite particle (e.g., secondary particle), but may also be present at the interface between primary particles constituting the composite particle.

In addition, the coating layer may be present as a layer that continuously or discontinuously coats the surface(s) of the primary particle and/or the secondary particle. When the coating layer is discontinuously present, it may be present in an island shape. In another case, the coating layer may be present in the form of a solid solution that does not form a boundary between the primary particles and/or the secondary particle formed by aggregating the primary particles.

Meanwhile, the first coating layer and the second coating layer may be obtained by first calcination after precursors of the first lithium composite oxide and the second lithium composite oxide are mixed with a raw material for the metal oxide represented by Formula 2, or first calcination of precursors of the first lithium composite oxide and the second lithium composite oxide, mixing of the calcined product with a raw material for the metal oxide represented by Formula 2 and then second calcination. Here, the first lithium composite oxide and the second lithium composite oxide may be independently subjected to first calcination.

For example, when the first lithium composite oxide and the second lithium composite oxide, which are obtained by performing first calcination of the precursor of the first lithium composite oxide and the precursor of the second lithium composite oxide independently, are mixed with the raw material for the metal oxide represented by Formula 2, and then subjected to a coating process, the first coating layer and the second coating layer may be formed on the surfaces of the first lithium composite oxide and the second lithium composite oxide, respectively, but in this case, a coating raw material may be predisposed toward small particles with a relatively large specific surface area.

In this case, the difference between an occupancy ratio of the first coating layer on the surface of the first lithium composite oxide, which is a small particle, and an occupancy ratio of the second coating layer on the surface of the second lithium composite oxide becomes large, and thus may become a cause of reducing the electrochemical properties and stability of a bimodal-type positive electrode active material in which the first lithium composite oxide and the second lithium composite oxide are mixed in a predetermined ratio.

Accordingly, in the bimodal-type positive electrode active material in which the first lithium composite oxide, which is a small particle, and the second lithium composite oxide, which is a large particle, are mixed in a predetermined ratio, to prevent the reduction in electrochemical properties and stability of the positive electrode active material caused by a difference between an occupancy ratio of the first coating layer on the surface of the first lithium composite oxide and an occupancy ratio of the second coating layer on the surface of the second lithium composite oxide, provided that the occupancy ratio (at %) of the first coating layer on the surface of the first lithium composite oxide is r1, and the occupancy ratio (at %) of the second coating layer on the surface of the second lithium composite oxide is r2, the r1 and r2 preferably satisfy the following Equation 1.

Here, the occupancy ratio (at %) of the first coating layer on the surface of the first lithium composite oxide and the occupancy ratio (at %) of the second coating layer on the surface of the second lithium composite oxide may be defined as a content (at %) of the first coating layer (more specifically, a metal element specific to the metal oxide represented by Formula 2 in the first coating layer) present on the surface of the first lithium composite oxide and a content (at %) of the second coating layer (more specifically, a metal element specific to the metal oxide represented by Formula 2 in the second coating layer) present on the surface of the second lithium composite oxide, respectively. Here, the metal elements subjected to measurement of the r1 and r2 may be the same.

For example, the occupancy ratio (r1) of the first coating layer on the surface of the first lithium composite oxide, the occupancy ratio (r2) of the second coating layer on the surface of the second lithium composite oxide, and the ratio thereof (r2/r1) may be obtained by identifying the composition of the metal elements on the surfaces of the first lithium composite oxide and the second lithium composite oxide on which the first coating layer and the second coating layer are not present, identifying the composition of metal elements on the surfaces after forming the first coating layer and the second coating layer on the surfaces of the first lithium composite oxide and the second lithium composite oxide, respectively, and measuring the change in contents of metal elements specifically included in the metal oxides constituting the first coating layer and the second coating layer.

That is, the occupancy ratio (r1) of the first coating layer on the surface of the first lithium composite oxide and the occupancy ratio (r2) of the second coating layer on the surface of the second lithium composite oxide may refer to area ratios of the first coating layer and the second coating layer, which cover the surfaces of the first lithium composite oxide and the second lithium composite oxide, respectively, but may be understood as content ratios of the first coating layer and the second coating layer, which are present on the surfaces of the first lithium composite oxide and the second lithium composite oxide.

$$0.71 < r2/r1 \quad \text{[Equation 1]}$$

When the r2/r1 expressed by Equation 1 is 0.71 or less, as an occupancy ratio of the first coating layer on the surface of the first lithium composite oxide with respect to an occupancy ratio of the second coating layer on the surface of the second lithium composite oxide excessively increases, likewise, there may be a difference in surface characteristics between the first lithium composite oxide and the second lithium composite oxide, thereby reducing the electrochemical properties and stability of the positive electrode active material.

More specifically, the r1 and r2 may satisfy the following Equation 2.

$$0.72 \leq r2/r1 < 1.23 \quad \text{[Equation 2]}$$

When the r2/r1 expressed by Equation 2 is 1.23 or more, as an occupancy ratio of the second coating layer on the surface of the second lithium composite oxide with respect to an occupancy ratio of the first coating layer on the surface of the first lithium composite oxide excessively increases, likewise, there may be a difference in surface characteristics between the first lithium composite oxide and the second lithium composite oxide, thereby reducing the electrochemical properties and stability of the positive electrode active material.

In addition, as described above, the first lithium composite oxide and the second lithium composite oxide may be composite particles including at least one primary particle enabling lithium intercalation/deintercalation. When there are a plurality of primary particles included in the first lithium composite oxide and/or the second lithium composite oxide, the plurality of primary particles may aggregate with each other, thereby forming a secondary particle.

The primary particle refers to one grain or crystallite, and the secondary particle refers to an aggregate formed by aggregating a plurality of primary particles. There may be voids and/or a grain boundary between the primary particles constituting the secondary particle.

Additionally, according to the present invention, as the first lithium composite oxide and the second lithium composite oxide in the bimodal-type positive electrode active material are allowed to have grain boundary densities within different ranges, it is possible to further reduce the difference in occupancy ratio of the coating layers occupying at least a part of the surfaces of the first lithium composite oxide and the second lithium composite oxide.

Specifically, the first lithium composite oxide may be a composite particle consisting of at least one primary particle, and the first lithium composite oxide may have a grain boundary density, which is calculated by Equation 3 below, of 0.75 or less with respect to the primary particles lying on the imaginary straight line crossing the center of the first lithium composite oxide in the cross-section SEM image of the first lithium composite oxide.

Grain boundary density=(Number of interfaces between primary particles lying on the imaginary straight line/number of primary particles lying on the imaginary straight line) [Equation 3]

Figure 2:
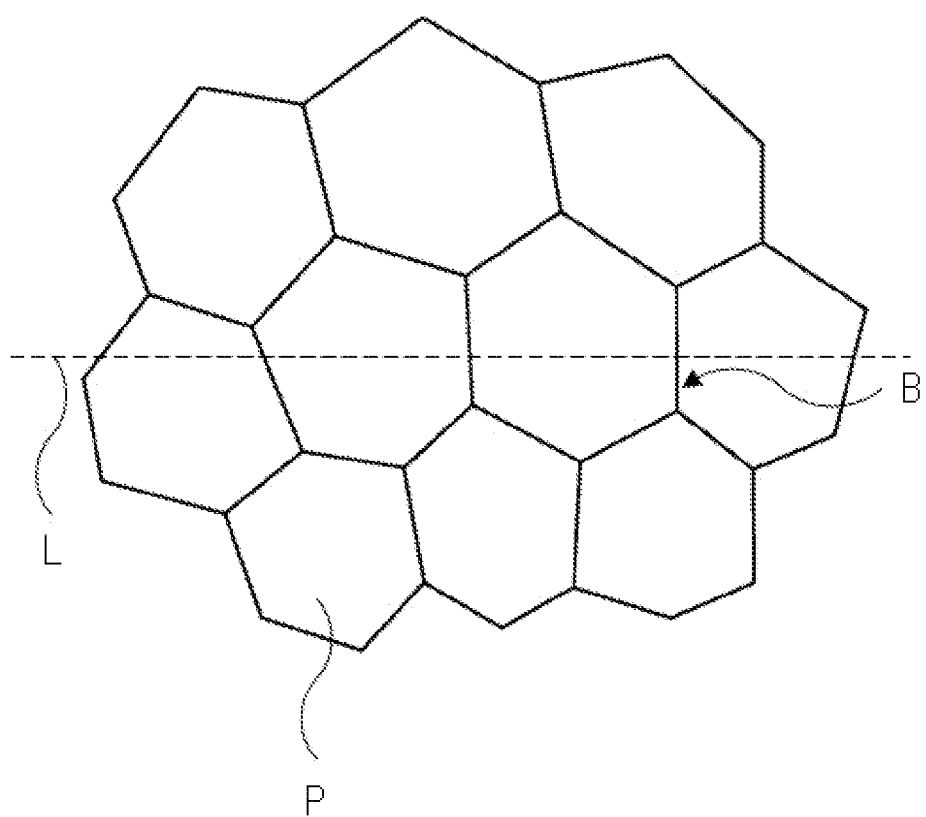

FIGS. 1 and 2 schematically show the cross-sections of the lithium composite oxides for calculating the grain boundary densities defined in the present invention. Referring to FIGS. 1 and 2, the grain boundary densities of the lithium composite oxides, which are calculated with reference to FIGS. 1 and 2, are shown in Table 1 below.

TABLE 1

| Classification | FIG. 1 | FIG. 2 |
| --- | --- | --- |
| Number of interfaces (grain boundaries) between primary particles lying on imaginary straight line | 0 | 3 |
| Number of primary particles lying on imaginary straight line | 1 | 4 |
| Grain boundary density | 0 | 0.75 |

Here, as shown in FIG. 1, the first lithium composite oxide may have no grain boundary between primary particles lying on the imaginary straight line, and as the number of the primary particles lying on the imaginary straight line is 1, the first lithium composite oxide may have a single crystal structure, which has a grain boundary density of 0.

As the grain boundary density expressed by Equation 3 has a value of 0.75 or less, it is possible to reduce the difference between the occupancy ratio of the first coating layer on the surface of the first lithium composite oxide and the occupancy ratio of the second coating layer on the surface of the second lithium composite oxide.

Meanwhile, the second lithium composite oxide is a composite particle consisting of at least one primary particle, and the second lithium composite oxide may have a grain boundary density calculated by the following Equation 3 of 0.90 or more with respect to the primary particles lying on the imaginary straight line crossing the center of the second lithium composite oxide in the cross-section SEM image of the second lithium composite oxide.

Grain boundary density=(Number of interfaces between primary particles lying on the imaginary straight line/number of primary particles lying on the imaginary straight line) [Equation 3]

As a void is filled with small particles with a small average particle size, the integration density of a lithium composite oxide in a unit volume may be improved, thereby increasing an energy density per unit volume.

In addition, the bimodal-type positive electrode active materials according to various examples of the present invention may reduce the difference in occupancy ratios of the coating layers present on at least a part of the surfaces of the first lithium composite oxide and the second lithium composite oxide, thereby preventing the reduction in the electrochemical properties and stability of the bimodal-type positive electrode active materials.

Particularly, according to the present invention, as the first lithium composite oxide and the second lithium composite oxide in the bimodal-type positive electrode active material are allowed to have grain boundary densities within different ranges, it is possible to reduce the difference between occupancy ratios of coating layers occupying at least a part of the surfaces of the first lithium composite oxide and the second lithium composite oxide.

Lithium Secondary Battery

Another aspect of the present invention may provide a positive electrode including a positive electrode current collector and a positive electrode active material layer formed on the positive electrode current collector. Here, the positive electrode active material layer may include positive electrode active materials according to various embodiments of the present invention. Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The appearance of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Preparation Example 1. Preparation of Positive Electrode Active Material (1) Example 1

$NiCoMn(OH)_2$ hydroxide precursors (Ni:Co:Mn=91:8:1 (at %)) of a first lithium composite oxide, which is a small particle, and a second lithium composite oxide, which is a large particle, were synthesized using a known co-precipitation method using nickel sulfate, cobalt sulfate and manganese sulfate. The average particle diameter (D50) of the hydroxide precursor (first hydroxide precursor) of the first lithium composite oxide was 3.0 μm, and the average particle diameter (D50) of the hydroxide precursor (second hydroxide precursor) of the second lithium composite oxide was 18.0 μm.

Subsequently, LiOH (Li/(Ni+Co+Mn) mol ratio=1.05±0.05) was mixed into the first hydroxide precursor, and thermally treated (first calcination) for 12 hours by raising a temperature 2° C. per minute until 850° C. in a calcination furnace, while maintaining an $O_2$ atmosphere, thereby obtaining a first lithium composite oxide, which is a small particle.

In addition, separately, a second lithium composite oxide, which is a large particle, was obtained by mixing LiOH (Li/(Ni+Co+Mn) mol ratio=1.05±0.05) into the second hydroxide precursor and thermally treating (first calcination) the mixture for 12 hours by raising a temperature 2° C. per minute until 700° C. in a calcination furnace while maintaining an $O_2$ atmosphere.

And then, a mixture was prepared by mixing the first lithium composite oxide and the second lithium composite oxide in a weight ratio of 10:90, and distilled water was added to the mixture, followed by washing for 1 hour.

Subsequently, 3.0 mol % cobalt sulfate was added to the mixture while stirring so as to coat the surfaces of the first lithium composite oxide and the second lithium composite oxide in the mixture with Co. Afterward, the coated products were dried in a vacuum dryer at 120° C. for 12 hours.

Finally, a bimodal-type positive electrode active material in which a first lithium composite oxide, which is a small particle, and a second lithium composite oxide, which is a large particle, were mixed in a predetermined ratio, was obtained by thermal treatment (second calcination) for 12 hours by raising a temperature 2° C. per minute until 700° C. in a calcination furnace while maintaining an O2 atmosphere.

(2) Example 2

A positive electrode active material was prepared in the same manner as Example 1, except that, before washing, the first lithium composite oxide and the second lithium composite oxide were mixed in a weight ratio of 20:80.

(3) Example 3

A positive electrode active material was prepared in the same manner as Example 1, except that, before washing, the first lithium composite oxide and the second lithium composite oxide were mixed in a weight ratio of 30:70.

(4) Example 4

A positive electrode active material was prepared in the same manner as Example 1, except that, before washing, the first lithium composite oxide and the second lithium composite oxide were mixed in a weight ratio of 40:60.

(5) Example 5

A positive electrode active material was prepared in the same manner as Example 1, except that, before washing, the first lithium composite oxide and the second lithium composite oxide were mixed in a weight ratio of 50:50.

(6) Example 6

A positive electrode active material was prepared in the same manner as Example 3, except that, before first calcination, a 0.5 mol % Ba-containing compound $(Ba(OH)_2)$ was additionally mixed into each of the first hydroxide precursor and the second hydroxide precursor and then thermally treated.

(7) Example 7

A positive electrode active material was prepared in the same manner as Example 3, except that, before first calcination, a 0.5 mol % Sr-containing compound $(Sr(OH)_2)$ was additionally mixed into each of the first hydroxide precursor and the second hydroxide precursor and then thermally treated.

(8) Example 8

A positive electrode active material was prepared in the same manner as Example 3, except that, before first calcination, a 0.5 mol % Mg-containing compound ($Mg(OH)_2$) was additionally mixed into each of the first hydroxide precursor and the second hydroxide precursor and then thermally treated.

(9) Example 9

A positive electrode active material was prepared in the same manner as Example 3, except that, before first calcination, a 0.5 mol % Na-containing compound ($Na(NO)_3$) was additionally mixed into each of the first hydroxide precursor and the second hydroxide precursor and then thermally treated.

(10) Example 10

A positive electrode active material was prepared in the same manner as Example 3, except that, before first calcination, a 0.2 mol % Nb-containing compound ($Nb_2O_5$) was additionally mixed into each of the first hydroxide precursor and the second hydroxide precursor and then thermally treated.

(11) Example 11

A positive electrode active material was prepared in the same manner as Example 3, except that, before first calcination, a 0.2 mol % W-containing compound ($WO_3$) was additionally mixed into each of the first hydroxide precursor and the second hydroxide precursor and then thermally treated.

(12) Example 12

A positive electrode active material was prepared in the same manner as Example 3, except that, before first calcination, a 0.3 mol % Zr-containing compound ($ZrO_2$) was additionally mixed into each of the first hydroxide precursor and the second hydroxide precursor and then thermally treated.

(13) Example 13

A positive electrode active material was prepared in the same manner as Example 12, except that 3.0 mol % aluminum sulfate, instead of 3.0 mol % cobalt sulfate, was added to the mixture of the first lithium composite oxide and the second lithium composite oxide for Al coating.

(14) Example 14

A positive electrode active material was prepared in the same manner as Example 12, except that 3.0 mol % manganese sulfate, instead of 3.0 mol % cobalt sulfate, was added to the mixture of the first lithium composite oxide and the second lithium composite oxide for Mn coating.

(15) Example 15

A positive electrode active material was prepared in the same manner as Example 12, except that 3.0 mol % zirconium nitrate, instead of 3.0 mol % cobalt sulfate, was added to the mixture of the first lithium composite oxide and the second lithium composite oxide for Zr coating.

(16) Example 16

A positive electrode active material was prepared in the same manner as Example 12, except that a positive electrode active material was obtained by preparing a mixture by mixing the first lithium composite oxide and the second lithium composite oxide in a weight ratio of 30:70, adding distilled water to the mixture to wash for 1 hour, and drying the washed mixture in a vacuum dryer at 120° C. for 12 hours, and then 1.0 mol % $Nb_2O_5$ was mixed into the dried positive electrode active material and thermally treated (second calcination) for 12 hours by raising a temperature 2° C. per minute until 700° C. in a calcination furnace while maintaining an $O_2$ atmosphere for Nb coating.

(17) Example 17

A positive electrode active material was prepared in the same manner as Example 16, except that 1.0 mol % cobalt phosphate, instead of 1.0 mol % $Nb_2O_5$, was mixed into the dried positive electrode active material, and thermally treated (second calcination) for 12 hours by raising a temperature 2° C. per minute until 700° C. in a calcination furnace while maintaining an $O_2$ atmosphere for coating with cobalt phosphate.

(18) Comparative Example 1

A positive electrode active material was prepared in the same manner as Example 1, except that a first lithium composite oxide, which is a small particle, was obtained by mixing LiOH (Li/(Ni+Co+Mn) mol ratio=1.05±0.05) into the first hydroxide precursor, and thermally treating (first calcination) the mixture for 12 hours by raising a temperature 2° C. per minute until 700° C. in a calcination furnace while maintaining an $O_2$ atmosphere.

(19) Comparative Example 2

A positive electrode active material was prepared in the same manner as Example 1, except that a first lithium composite oxide, which is a small particle, was obtained by mixing LiOH (Li/(Ni+Co+Mn) mol ratio=1.05±0.05) into the first hydroxide precursor and thermally treating (first calcination) the mixture for 12 hours by raising a temperature 2° C. per minute until 700° C. in a calcination furnace while maintaining an $O_2$ atmosphere, and a mixture was prepared by mixing the first lithium composite oxide and the second lithium composite oxide in a weight ratio of 20:80.

(20) Comparative Example 3

A positive electrode active material was prepared in the same manner as Example 1, except that a first lithium composite oxide, which is a small particle, was obtained by mixing LiOH (Li/(Ni+Co+Mn) mol ratio=1.05±0.05) into the first hydroxide precursor and thermally treating (first calcination) the mixture for 12 hours by raising a temperature 2° C. per minute until 700° C. in a calcination furnace while maintaining an $O_2$ atmosphere, and a mixture was prepared by mixing the first lithium composite oxide and the second lithium composite oxide in a weight ratio of 30:70.

(21) Comparative Example 4

A positive electrode active material was prepared in the same manner as Example 1, except that a first lithium composite oxide, which is a small particle, was obtained by mixing LiOH (Li/(Ni+Co+Mn) mol ratio=1.05±0.05) into the first hydroxide precursor and thermally treating (first calcination) the mixture for 12 hours by raising a temperature 2° C. per minute until 700° C. in a calcination furnace while maintaining an $O_2$ atmosphere, and a mixture was prepared by mixing the first lithium composite oxide and the second lithium composite oxide in a weight ratio of 40:60.

(22) Comparative Example 5

A positive electrode active material was prepared in the same manner as Example 1, except that a first lithium composite oxide, which is a small particle, was obtained by mixing LiOH (Li/(Ni+Co+Mn) mol ratio=1.05±0.05) into the first hydroxide precursor and thermally treating (first calcination) the mixture for 12 hours by raising a temperature 2° C. per minute until 700° C. in a calcination furnace while maintaining an $O_2$ atmosphere, and a mixture was prepared by mixing the first lithium composite oxide and the second lithium composite oxide in a weight ratio of 50:50.

(23) Comparative Example 6

A positive electrode active material was prepared in the same manner as Example 1, except that, before washing, the first lithium composite oxide and the second lithium composite oxide were mixed in a weight ratio of 3:97.

Preparation Example 2. Production of Lithium Secondary Battery

A positive electrode slurry was prepared by dispersing 92 wt % of each of the positive electrode active materials prepared according to Preparation Example 1, 4 wt % of artificial graphite, and 4 wt % of a PVDF binder in 30 g of N-methyl-2 pyrrolidone (NMP). A positive electrode for a lithium secondary battery was formed by uniformly coating an aluminum thin film having a thickness of 15 μm with the positive electrode slurry and vacuum-drying the coated film at 135° C.

A coin battery was produced using a lithium foil as a counter electrode for the positive electrode, a porous polyethylene film (Celgard 2300, thickness: 25 μm) as a separator, and an electrolyte in which $LiPF_6$ was present at a concentration of 1.15M in a solvent in which ethylene carbonate and ethyl methyl carbonate were mixed in a volume ratio of 3:7 was used.

Experimental Example 1. Analysis of Structure of Positive Electrode Active Material (1) SEM/EDS Analyses for Positive Electrode Active Material To measure the distribution of a coating layer and the content of a coating element on the surfaces of a first lithium composite oxide, which is a small particle, and a second lithium composite oxide, which is a large particle, which are included in each of the positive electrode active materials prepared according to Preparation Example 1, first, the uncoated surfaces of the first lithium composite oxide and second lithium composite oxide were analyzed by EDS, and a base line was set.

Afterward, the coated surfaces of the first lithium composite oxide and second lithium composite oxide were analyzed through EDS to calculate the difference in content of a coating element before/after coating according to the predetermined method described in Preparation Example 1, thereby measuring the occupancy ratio (r1) of a first coating layer and the occupancy ratio (r2) of a second coating layer.

TABLE 2

| Classification | r1 (at %) | r2 (at %) | r2/r1 |
|---|---|---|---|
| Example 1 | 44 | 52 | 1.18 |
| Example 2 | 44 | 47 | 1.07 |
| Example 3 | 45 | 44 | 0.98 |
| Example 4 | 45 | 36 | 0.80 |
| Example 5 | 45 | 34 | 0.76 |
| Example 6 | 43 | 44 | 1.02 |
| Example 7 | 45 | 45 | 1.00 |
| Example 8 | 45 | 44 | 0.98 |
| Example 9 | 43 | 44 | 1.02 |
| Example 10 | 46 | 45 | 0.98 |
| Example 11 | 44 | 46 | 1.05 |
| Example 12 | 44 | 47 | 1.07 |
| Example 13 | 23 | 22 | 0.96 |
| Example 14 | 35 | 36 | 1.03 |
| Example 15 | 29 | 32 | 1.10 |
| Example 16 | 12 | 13 | 1.08 |
| Example 17 | 17 | 16 | 0.94 |
| Comparative Example 1 | 45 | 32 | 0.71 |
| Comparative Example 2 | 47 | 31 | 0.66 |
| Comparative Example 3 | 50 | 27 | 0.54 |
| Comparative Example 4 | 53 | 24 | 0.45 |
| Comparative Example 5 | 59 | 20 | 0.34 |
| Comparative Example 6 | 48 | 59 | 1.23 |

(2) Cross-Sectional SEM Analysis for Positive Electrode Active Material

Cross-sectional SEM images were obtained using FE-SEM (Bruker) for each of a first lithium composite oxide, which is a small particle, and a second lithium composite oxide, which is a large particle, which are included in each of the positive electrode active materials prepared according to Preparation Example 1, and then an average value of a grain boundary density according to the following Equation 3 was calculated from the cross-sectional SEM image.

grain boundary density=(Number of interfaces between primary particles lying on the imaginary straight line crossing the center of the lithium composite oxide/number of primary particles lying on the imaginary straight line, in the cross-sectional SEM image of lithium composite oxide)  [Equation 3]

The measurement results of the grain boundary density are shown in Table 3 below.

TABLE 3

| | Average value of grain boundary density | |
|---|---|---|
| Classification | First lithium composite oxide | Second lithium composite oxide |
| Example 1 | 0.75 | 0.99 |
| Example 2 | 0.75 | 0.99 |
| Example 3 | 0.75 | 0.99 |
| Example 4 | 0.75 | 0.99 |
| Example 5 | 0.75 | 0.99 |
| Example 6 | 0.67 | 0.99 |
| Example 7 | 0.67 | 0.99 |
| Example 8 | 0.75 | 0.99 |
| Example 9 | 0.75 | 0.99 |
| Example 10 | 0.75 | 0.99 |

TABLE 3-continued

| | Average value of grain boundary density | |
|---|---|---|
| Classification | First lithium composite oxide | Second lithium composite oxide |
| Example 11 | 0.75 | 0.99 |
| Example 12 | 0.67 | 0.99 |
| Example 13 | 0.67 | 0.99 |
| Example 14 | 0.67 | 0.99 |
| Example 15 | 0.67 | 0.99 |
| Example 16 | 0.67 | 0.99 |
| Example 17 | 0.67 | 0.99 |
| Comparative Example 1 | 0.91 | 0.99 |
| Comparative Example 2 | 0.91 | 0.99 |
| Comparative Example 3 | 0.91 | 0.99 |
| Comparative Example 4 | 0.91 | 0.99 |
| Comparative Example 5 | 0.91 | 0.99 |
| Comparative Example 6 | 0.75 | 0.99 |

Experimental Example 2. Evaluation of Electrochemical Properties of Positive Electrode Active Material (1) Evaluation of Battery Capacity and Lifetime Characteristic of Lithium Secondary Battery Charging/discharging experiments, in which 25° C., a voltage range of 3.0V to 4.25V, and a discharge rate of 0.5 C to 4.0 C were applied, were performed on the lithium secondary battery produced according to Preparation Example 2 using an electrochemical analyzer (Toyo, Toscat-3100) to measure an initial charge capacity, an initial discharge capacity and an energy density. The energy density (Wh/L) was calculated according to Equation 4 below.

Energy density (Wh/L)=initial discharge capacity*average voltage*press density  [Equation 4]

In addition, 50 cycles of charging/discharging were performed on the lithium secondary battery produced by the above-described method at 25° C., within a driving voltage range of 3.0V to 4.4V under a 1 C/1 C condition, and a ratio of the discharge capacity at 50 cycles with respect to the initial capacity (cycle capacity retention) was measured.

The results of evaluating the electrochemical properties of the lithium secondary battery measured according to the method are shown in Table 4 below.

TABLE 4

| | | | | Energy density | | |
|---|---|---|---|---|---|---|
| Classification | Initial charge capacity (mAh/g) | Initial discharge capacity (mAh/g) | Average voltage (V) | Particle press density (g/cc) | Wh/L | Lifetime (%, @ 50 cy) |
| Example 1 | 239.6 | 211.6 | 3.65 | 3.63 | 2804 | 88.0 |
| Example 2 | 238.2 | 209.7 | 3.65 | 3.69 | 2824 | 88.3 |
| Example 3 | 238.1 | 208.5 | 3.65 | 3.74 | 2846 | 88.6 |
| Example 4 | 238.3 | 208.4 | 3.65 | 3.73 | 2837 | 89.4 |
| Example 5 | 238.0 | 207.4 | 3.65 | 3.69 | 2793 | 90.6 |
| Example 6 | 238.3 | 208.1 | 3.65 | 3.73 | 2833 | 88.3 |
| Example 7 | 238.1 | 208.5 | 3.65 | 3.74 | 2846 | 88.7 |
| Example 8 | 238.0 | 208.9 | 3.65 | 3.74 | 2852 | 88.4 |
| Example 9 | 238.3 | 208.8 | 3.65 | 3.72 | 2835 | 88.7 |
| Example 10 | 238.4 | 208.8 | 3.65 | 3.74 | 2850 | 88.2 |
| Example 11 | 238.7 | 208.3 | 3.65 | 3.74 | 2844 | 88.5 |
| Example 12 | 238.8 | 208.9 | 3.65 | 3.74 | 2852 | 88.8 |
| Example 13 | 238.2 | 208.5 | 3.65 | 3.72 | 2831 | 88.8 |
| Example 14 | 238.6 | 208.1 | 3.65 | 3.73 | 2833 | 89.1 |
| Example 15 | 238.5 | 208.9 | 3.65 | 3.71 | 2829 | 89.1 |
| Example 16 | 239.4 | 209.1 | 3.65 | 3.74 | 2854 | 88.8 |
| Example 17 | 239.1 | 209.5 | 3.65 | 3.72 | 2845 | 88.4 |
| Comparative Example 1 | 239.8 | 212.0 | 3.65 | 3.51 | 2716 | 86.1 |
| Comparative Example 2 | 240.0 | 212.3 | 3.65 | 3.57 | 2766 | 86.7 |
| Comparative Example 3 | 238.8 | 210.8 | 3.65 | 3.62 | 2785 | 86.8 |
| Comparative Example 4 | 238.1 | 210.9 | 3.65 | 3.62 | 2787 | 87.3 |
| Comparative Example 5 | 236.6 | 209.3 | 3.65 | 3.60 | 2750 | 87.1 |
| Comparative Example 6 | 239.6 | 211.0 | 3.65 | 3.31 | 2549 | 86.5 |

Referring to the results shown in Table 4, it can be confirmed that the positive electrode active materials according to Examples 1 to 17 exhibited an energy density of 2800 Wh/L or more and a lifetime characteristic of 88% or more, whereas the positive electrode active materials according to Comparative Examples 1 to 6 exhibited a lower energy density and a lower lifetime characteristic than those of Examples 1 to 17.

Experimental Example 3. Evaluation of Stability of Positive Electrode Active Material and Lithium Secondary Battery (1) Evaluation of Thermal Stability of Positive Electrode Active Material To evaluate the thermal stability of the positive electrode active materials prepared according to Preparation Example 1, a weight loss was measured at a temperature increasing rate of 10° C./min from 25° C. to 350° C. in an Ar atmosphere at atmospheric pressure using a thermogravimetric analyzer (TA Instruments, Q20). Here, the starting temperature (op-set) at which the weight loss (pyrolysis) peak appears in each positive electrode active material is shown in Table 5 below.

TABLE 5

| Classification | On-set Temp. (° C.) |
|---|---|
| Example 1 | 234.8 |
| Example 2 | 236.3 |
| Example 3 | 237.5 |
| Example 4 | 238.7 |
| Example 5 | 243.8 |
| Example 6 | 239.3 |
| Example 7 | 238.2 |
| Example 8 | 237.8 |
| Example 9 | 237.1 |
| Example 10 | 237.5 |
| Example 11 | 237.3 |
| Example 12 | 237.0 |
| Example 13 | 237.9 |
| Example 14 | 237.0 |
| Example 15 | 237.8 |
| Example 16 | 237.7 |
| Example 17 | 237.9 |
| Comparative Example 1 | 234.3 |
| Comparative Example 2 | 232.6 |
| Comparative Example 3 | 233.8 |

TABLE 5-continued

| Classification | On-set Temp. (° C.) |
| --- | --- |
| Comparative Example 4 | 233.5 |
| Comparative Example 5 | 234.7 |
| Comparative Example 6 | 234.5 |

Referring to the result shown in Table 5, it was confirmed that the starting temperature (op-set) at which the weight loss (pyrolysis) peak appears in the positive electrode active materials according to Examples 1 to 17 is higher than those of Comparative Examples 1 to 6. That is, it can be shown that the thermal stability of the positive electrode active materials according to Examples 1 to 17 is higher than that of the positive electrode active materials according to Comparative Examples 1 to 6.

(2) Measurement of Amount of Gas Generation in Lithium Secondary Battery

The lithium secondary battery produced according to Preparation Example 2 was charged at a constant current of 0.2 C until 4.25V, stored at 60° C. for 14 days, followed by measuring a volumetric change in lithium secondary battery caused by gas generation in a lithium secondary battery. The result of measuring the volumetric change is shown in Table 6 below.

TABLE 6

| Classification | Amount of gas generation ($\Delta cm^3$) |
| --- | --- |
| Example 1 | 0.24 |
| Example 2 | 0.22 |
| Example 3 | 0.16 |
| Example 4 | 0.13 |
| Example 5 | 0.09 |
| Example 6 | 0.15 |
| Example 7 | 0.20 |
| Example 8 | 0.13 |
| Example 9 | 0.18 |
| Example 10 | 0.17 |
| Example 11 | 0.14 |
| Example 12 | 0.17 |
| Example 13 | 0.13 |
| Example 14 | 0.16 |
| Example 15 | 0.19 |
| Example 16 | 0.13 |
| Example 17 | 0.19 |
| Comparative Example 1 | 0.30 |
| Comparative Example 2 | 0.31 |
| Comparative Example 3 | 0.32 |
| Comparative Example 4 | 0.35 |
| Comparative Example 5 | 0.36 |
| Comparative Example 6 | 0.28 |

Referring to the result of Table 6, it can be confirmed that the volumetric changes in lithium secondary batteries using the positive electrode active materials according to Examples 1 to 17 are smaller than those in lithium secondary batteries using the positive electrode active materials according to Comparative Examples 1 to 6.

Positive electrode active materials according to various embodiments of the present invention are bimodal-type positive electrode active materials, each of which includes a first lithium composite oxide, which is small particle, and a second lithium composite oxide, which is a large particle, these particles have different average particle sizes. Voids between the large particles can be filled with small particles with relatively small average particle diameters, so that the integration density of a lithium composite oxide in unit volume can be enhanced and thus the energy density per unit volume can increase.

In addition, according to the present invention, the deterioration in the electrochemical properties and stability of the bimodal-type positive electrode active material can be prevented by reducing the deviation between occupancy ratios of coating layers at least partially present on the surfaces of the small particle and the large particle.

Particularly, according to the present invention, as the first lithium composite oxide and the second lithium composite oxide in the bimodal-type positive electrode active material are allowed to have grain boundary densities within different ranges, it is possible to reduce the difference between occupancy ratios of coating layers occupying at least a part of the surfaces of the first lithium composite oxide and the second lithium composite oxide.

In addition to the above-described effects, the specific effects of the present invention will be described together while describing specific details for carrying out the present invention below.

In the above, the embodiments of the present invention have been described, but it will be understood by those of ordinary skill in the art that the present invention may be changed and modified in various ways by addition, alteration, or deletion of components without departing from the spirit of the present invention defined in the appended claims.

What is claimed is:

1. A bimodal-type positive electrode active material comprising a first lithium composite oxide particle and a second lithium composite oxide particle, which is larger than the first composite oxide particle,
   wherein each of the first lithium composite oxide particle and the second lithium composite oxide particle is represented by Formula 1 below:

$$Li_wNi_{1-(x+y+z)}Co_xM1_yM2_zO_{2+\alpha} \quad \text{[Formula 1]}$$

(Here,
M1 is at least one selected from Mn and Al,
M2 is at least one selected from P, Sr, Ba, B, Ce, Cr, Mn, Mo, Na, K, Ti, Zr, Al, Hf, Ta, Mg, V, Zn, Si, Y, Sn, Ge, Nb, W and Cu,
M1 and M2 are different from each other,
$0.5 \leq w \leq 1.5$, $0 \leq x \leq 0.50$, $0 \leq y \leq 0.20$, $0 \leq z \leq 0.20$, and $0 \leq \alpha \leq 0.02$),
wherein the positive electrode active material comprises:
a first coating layer covering at least a part of a surface of the first lithium composite oxide particle and comprising a first metal oxide comprising a first metal element; and
a second coating layer covering at least a part of a surface of the second lithium composite oxide particle and comprising a second metal oxide comprising a second metal element,
wherein
an occupancy ratio (at %) of the first coating layer on the surface of the first lithium composite oxide is r1, and an occupancy ratio (at %) of the second coating layer on the surface of the second lithium composite oxide is r2; and
the r1 and the r2 satisfy Equation 1 below:

$$0.71 < r2/r1, \text{ and} \quad \text{[Equation 1]}$$

wherein a weight ratio of the first lithium composite oxide particle and the second lithium composite oxide particle in the positive electrode active material is 5:95 to 50:50.

2. The bimodal-type positive electrode active material of claim 1, wherein the r1 and r2 satisfy Equation 2 below:

$$0.72 \leq r2/r1 < 1.23. \quad \text{[Equation 2]}$$

3. The bimodal-type positive electrode active material of claim 1, wherein each of the first metal oxide and the second metal oxide is represented by Formula 2 below:

$$Li_aM3_bO_c \quad \text{[Formula 2]}$$

(Here,
M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd,
$0 \leq a \leq 10$, $0 \leq b \leq 8$, and $2 \leq c \leq 13$).

4. The bimodal-type positive electrode active material of claim 1, wherein the first lithium composite oxide particle has an average particle diameter (D50) of 8 μm or less.

5. The bimodal-type positive electrode active material of claim 1, wherein the second lithium composite oxide particle has an average particle diameter (D50) of 8.5 μm or more.

6. The bimodal-type positive electrode active material of claim 1, wherein the first lithium composite oxide particle is a composite particle comprising at least one primary particle, and has a grain boundary density calculated by Equation 3 below of 0.75 or less with respect to the primary particles lying on the imaginary straight line crossing the center of the first lithium composite oxide particle in the cross-sectional SEM image of the first lithium composite oxide particle:

Grain boundary density=(Number of interfaces between primary particles lying on the imaginary straight line/number of primary particles lying on the imaginary straight line). [Equation 3]

7. The bimodal-type positive electrode active material of claim 6, wherein the first lithium composite oxide particle has a single crystal structure.

8. The bimodal-type positive electrode active material of claim 1, wherein the second lithium composite oxide particle is a composite particle comprising at least one primary, and has a grain boundary density calculated by Equation 3 below of 0.90 or more with respect to the primary particles lying on the imaginary straight line crossing the center of the second lithium composite oxide particle in the cross-sectional SEM image of the second lithium composite oxide particle:

Grain boundary density=(Number of interfaces between primary particles lying on the imaginary straight line/number of primary particles lying on the imaginary straight line). [Equation 3]

9. The bimodal-type positive electrode active material of claim 1, wherein the positive electrode active material has a press density of 3.63 g/cc or more.

10. A positive electrode comprising the bimodal-type positive electrode active material of claim 1.

11. A lithium secondary battery comprising the positive electrode of claim 10.

12. A bimodal-type positive electrode active material comprising a first particle and a second particle, the first particle has a smaller diameter than the second particle,
the first particle comprises:
a first lithium composite oxide particle that has a grain boundary density calculated by Equation 3 below of 0.75 or less, Grain boundary density=(Number of interfaces between primary particles lying on the imaginary straight line/number of primary particles lying on the imaginary straight line); and [Equation 3]

a first coating layer, which is covering at least a part of a surface of the first lithium composite oxide particle and comprising a first metal oxide that has a different composition from the first lithium composite oxide particle,
the second particle comprises:
a second lithium composite oxide particle that has a grain boundary density calculated by the above Equation 3 of 0.90 or more; and
a second coating layer, which is covering at least a part of a surface of the second lithium composite oxide particle and comprising a second metal oxide that has a different composition from the second lithium composite oxide particle,
when an occupancy ratio (at %) of the first coating layer on the surface of the first lithium composite oxide particle is r1, and an occupancy ratio (at %) of the second coating layer on the surface of the second lithium composite oxide particle is r2, the r1 and the r2 satisfy Equation 1 below:

$$0.71 < r2/r1, \quad \text{[Equation 1]}$$

wherein a weight ratio of the first lithium composite oxide particle and the second lithium composite oxide particle in the positive electrode active material is 5:95 to 50:50, and
wherein each of the first lithium composite oxide particle and the second lithium composite oxide particle is represented by Formula 1 below:

$$Li_wNi_{1-(x+y+z)}Co_xM1_yM2_zO_{2+\alpha} \quad \text{[Formula 1]}$$

(Here,
M1 is at least one selected from Mn and Al,
M2 is at least one selected from P, Sr, Ba, B, Ce, Cr, Mn, Mo, Na, K, Ti, Zr, Al, Hf, Ta, Mg, V, Zn, Si, Y, Sn, Ge, Nb, W and Cu,
M1 and M2 are different from each other,
$0.5 \leq w \leq 1.5$, $0 \leq x \leq 0.50$, $0 \leq y \leq 0.20$, $0 \leq z \leq 0.20$, and $0 \leq \alpha \leq 0.02$).

* * * * *